US010123221B2

(12) United States Patent
Hayes et al.

(10) Patent No.: US 10,123,221 B2
(45) Date of Patent: Nov. 6, 2018

(54) POWER ESTIMATION SYSTEM AND METHOD

(71) Applicant: Intel IP Corporation, Santa Clara, CA (US)

(72) Inventors: Matthew Hayes, Radebeul (DE); Denis Markovic, Nuremberg (DE); Viswanath Vajepeyazula, Bangalore (IN)

(73) Assignee: Intel IP Corporation, Santa Clara, CA (US)

( * ) Notice: Subject to any disclaimer, the term of this patent is extended or adjusted under 35 U.S.C. 154(b) by 74 days.

(21) Appl. No.: 15/274,394

(22) Filed: Sep. 23, 2016

(65) Prior Publication Data

US 2018/0091984 A1   Mar. 29, 2018

(51) Int. Cl.
  *H04L 12/26* (2006.01)
  *H04W 24/02* (2009.01)
  *H04L 5/00* (2006.01)

(52) U.S. Cl.
  CPC .............. *H04W 24/02* (2013.01); *H04L 5/006* (2013.01); *H04L 5/0048* (2013.01); *H04L 5/0073* (2013.01)

(58) Field of Classification Search
  None
  See application file for complete search history.

(56) References Cited

U.S. PATENT DOCUMENTS

| 5,093,723 A | 3/1992 | Yang |
| 6,573,761 B1 | 6/2003 | MacDonald et al. |
| 9,432,922 B1 | 8/2016 | Song et al. |
| 2003/0040908 A1* | 2/2003 | Yang ...................... H04R 3/005 704/233 |
| 2003/0083852 A1* | 5/2003 | Muhammad ........... H03D 7/125 702/190 |
| 2008/0101417 A1* | 5/2008 | Chapman ............. H04B 1/1027 370/497 |
| 2011/0149903 A1 | 6/2011 | Krishnamurthy et al. |

(Continued)

FOREIGN PATENT DOCUMENTS

WO   WO-2016/130827 A1   8/2016

OTHER PUBLICATIONS

Search Report dated Sep. 26, 2017 for International Patent Application No. PCT/US17/047565.

(Continued)

*Primary Examiner* — Otis L Thompson, Jr.
(74) *Attorney, Agent, or Firm* — Schiff Hardin LLP (57) ABSTRACT

A communication device can be configured to estimate a Reference-Signal-Received-Power (RSRP). The communication device can include a transceiver and a controller. The transceiver can be configured to downsample a received signal having a plurality of reference signal resource elements to generate a downsampled signal. The downsampling can alias a first of the plurality of reference signal resource elements into a second of the plurality of reference signal resource elements to generate an aliased reference signal resource element. The transceiver can also be configured to extract the aliased reference signal resource element from the downsampled signal. The controller can be connected to the transceiver and be configured to estimate the RSRP based on the extracted aliased reference signal resource element.

20 Claims, 9 Drawing Sheets

(56) References Cited

U.S. PATENT DOCUMENTS

| | | |
|---|---|---|
| 2011/0299618 A1 | 12/2011 | Hammerschmidt et al. |
| 2012/0099632 A1 | 4/2012 | Bury |
| 2012/0154038 A1* | 6/2012 | Kim ............... H03F 1/3247 330/149 |
| 2014/0168000 A1* | 6/2014 | Lemkin ............... H03M 1/1245 341/172 |
| 2014/0211655 A1 | 7/2014 | Yoo et al. |
| 2015/0116139 A1* | 4/2015 | Wuchert ............... H04L 25/00 341/120 |
| 2015/0187348 A1* | 7/2015 | Kang ............... G10L 21/0208 381/66 |
| 2015/0236739 A1 | 8/2015 | Montalvo et al. |
| 2015/0263747 A1* | 9/2015 | Ramakrishnan .... H03M 1/1085 341/120 |
| 2016/0066357 A1 | 3/2016 | Goldhamer |
| 2016/0308612 A1* | 10/2016 | Zhao ............... H04B 10/07955 |
| 2017/0012598 A1* | 1/2017 | Harris ............... H03H 7/12 |
| 2017/0086133 A1 | 3/2017 | Song et al. |
| 2017/0195027 A1* | 7/2017 | Baek ............... H04B 7/0617 |
| 2017/0214431 A1 | 7/2017 | Chen et al. |

OTHER PUBLICATIONS

PCT Written Opinion of the International Searching Authority—dated Nov. 2, 2017—International Application No. PCT/US2017/047565.

\* cited by examiner

POWER ESTIMATION SYSTEM AND METHOD

BACKGROUND

Field

Aspects described herein generally relate to power estimation, including power estimation of reference signals utilizing frequency aliasing.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

FIGS. 6A-8 illustrate a signal processing operation according to an exemplary aspect of the present disclosure.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

In the following disclosure, references to the Long-Term Evolution (LTE) standard are made. However, the more generic terms "mobile device" and "base station" are used herein except where otherwise noted to refer to the LTE terms "User Equipment (UE)" and "eNodeB/eNB," respectively.

As an overview, mobile devices may perform measurement of a serving cell and/or neighbor cells to maintain optimal signal strength, including in the presence of channel effects and mobility. In LTE, the mobile device can perform a measurement of the Reference-Signal-Received-Power (RSRP) using cell specific reference signals (cRS). These measurements are used to facilitate cell re-selection or handover depending on the connected state of the mobile device. To facilitate the best carrier selection, the mobile device may be configured to measure on multiple (inter-) frequency layers in addition the current carrier it is synchronized to. To conserve power, the mobile device can be configured to only perform measurements when the serving cell signal strength falls below a given threshold. This threshold can be determined by the network. In an idle mode, search and measurement procedures can significantly contribute to power consumption on the mobile device. Further, search and measurement procedures utilize power and memory resources of the mobile device, as well as valuable chip area of the hardware of the mobile device.

In exemplary aspects, memory and/or clock-rate requirements are reduced for search and measurement operations. In exemplary aspects, decimating operations can be performed on a received signal without anti-aliasing filtering.

For example, procedures (e.g., filtering) are generally performed to reduce/eliminate aliasing of frequencies because decimation of a sampled signal without applying filtering can cause typically unwanted out-of-band signals to alias into a desired bandwidth, which can cause interference with the desired signal.

In exemplary aspects, signal processing is performed to derive estimations of a wide-band RSRP after the signal is sub-sampled. For example, by decimating the signal to introduce aliased frequencies, measurement circuitry can be clocked at a reduced rate and consume less chip area as well as reduce the working memory requirements according to the decimation factor. The reduction in the memory requirements allow for lower current leakages in the memory. In exemplary aspects, the improved search and measurement procedures result reduced memory requirements and clock rate that lead to an overall reduction in power consumption of the mobile device. In a non-limiting example, the reduction in power consumption increases the availability and operation of battery powered mobile devices such as, for example, tablet computers, mobile telephones or smart-phones, and Internet-of-Things (IOT) devices. For example, IOT devices that can generally be expected to operate for extend periods of time (e.g., several months or years) on a single battery charge can benefit from the reduced power consumption realized by the search and measurement procedures of the exemplary aspects of the present disclosure.

Figure 1:
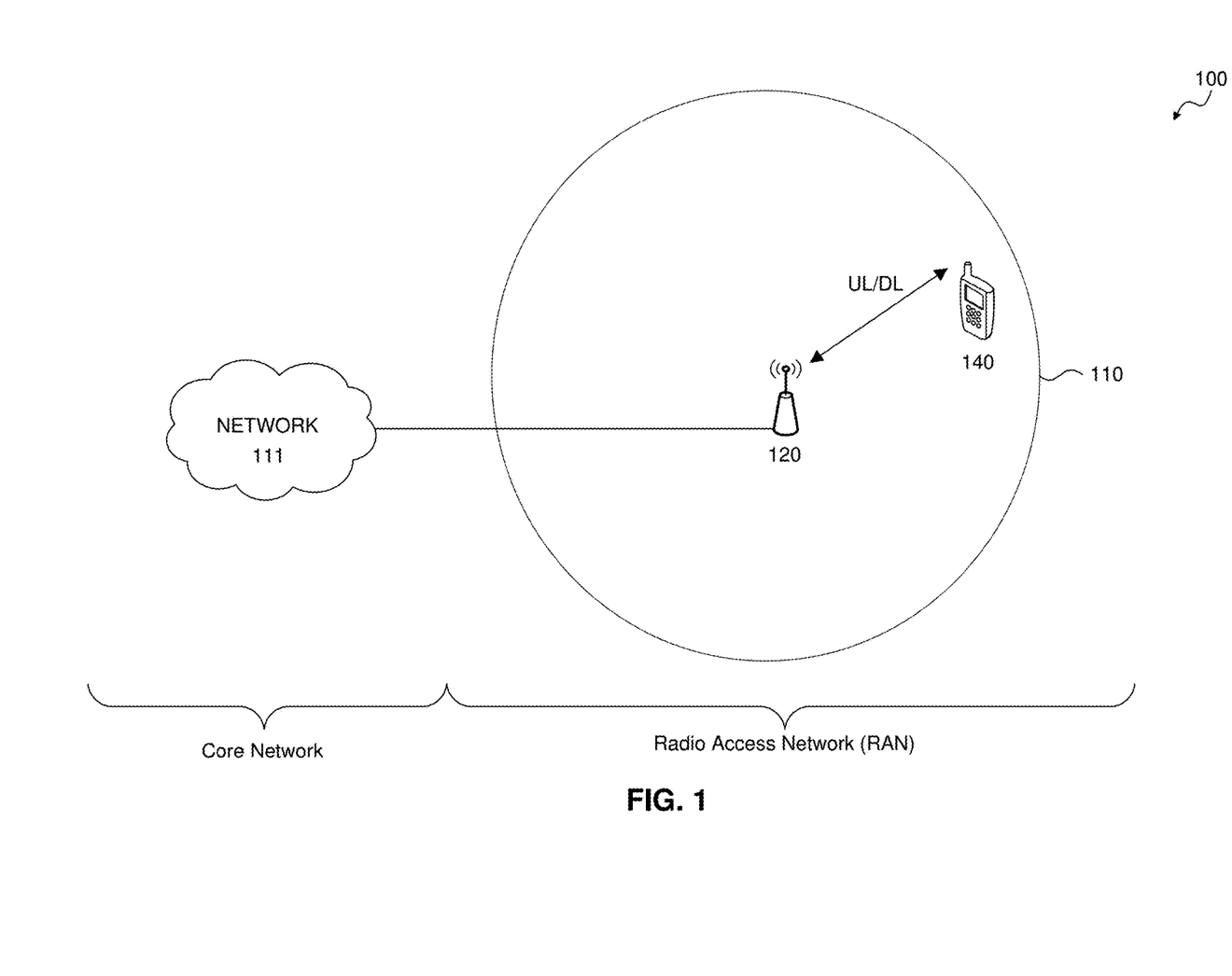
FIG. 1 illustrates an example network environment.

FIG. 1 illustrates an example communication environment 100 that includes a radio access network (RAN) and a core network. The RAN includes one or more base stations 120 and one or more mobile devices 140. The core network includes a backhaul communication network 111. In an exemplary aspect, the backhaul communication network 111 can include one or more well-known communication components—such as one or more network switches, one or more network gateways, and/or one or more servers. The backhaul communication network 111 can include one or more devices and/or components configured to exchange data with one or more other devices and/or components via one or more wired and/or wireless communications protocols. In exemplary aspects, the base stations 120 communicate with one or more service providers and/or one or more other base stations 120 via the backhaul communication network 111. In an exemplary aspect, the backhaul communication network is an internet protocol (IP) backhaul network. The number of base stations 120, mobile devices 140, and/or networks 111 are not limited to the quantities illustrated in FIG. 1, and the communication environment 100 can include any number of the various components as would be understood by one of ordinary skill in the relevant art(s).

The mobile device 140 and the base station 120 can each include a transceiver configured to transmit and/or receive wireless communications via one or more wireless technologies within the communication environment 100. In operation, the mobile device 140 can be configured to communicate with the base station 120 in a serving cell or sector 110 of the communication environment 100. For example, the mobile device 140 receives signals on one or more downlink (DL) channels from the base station 120, and transmits signals to the base station 120 on one or more respective uplink (UL) channels.

Figure 2:
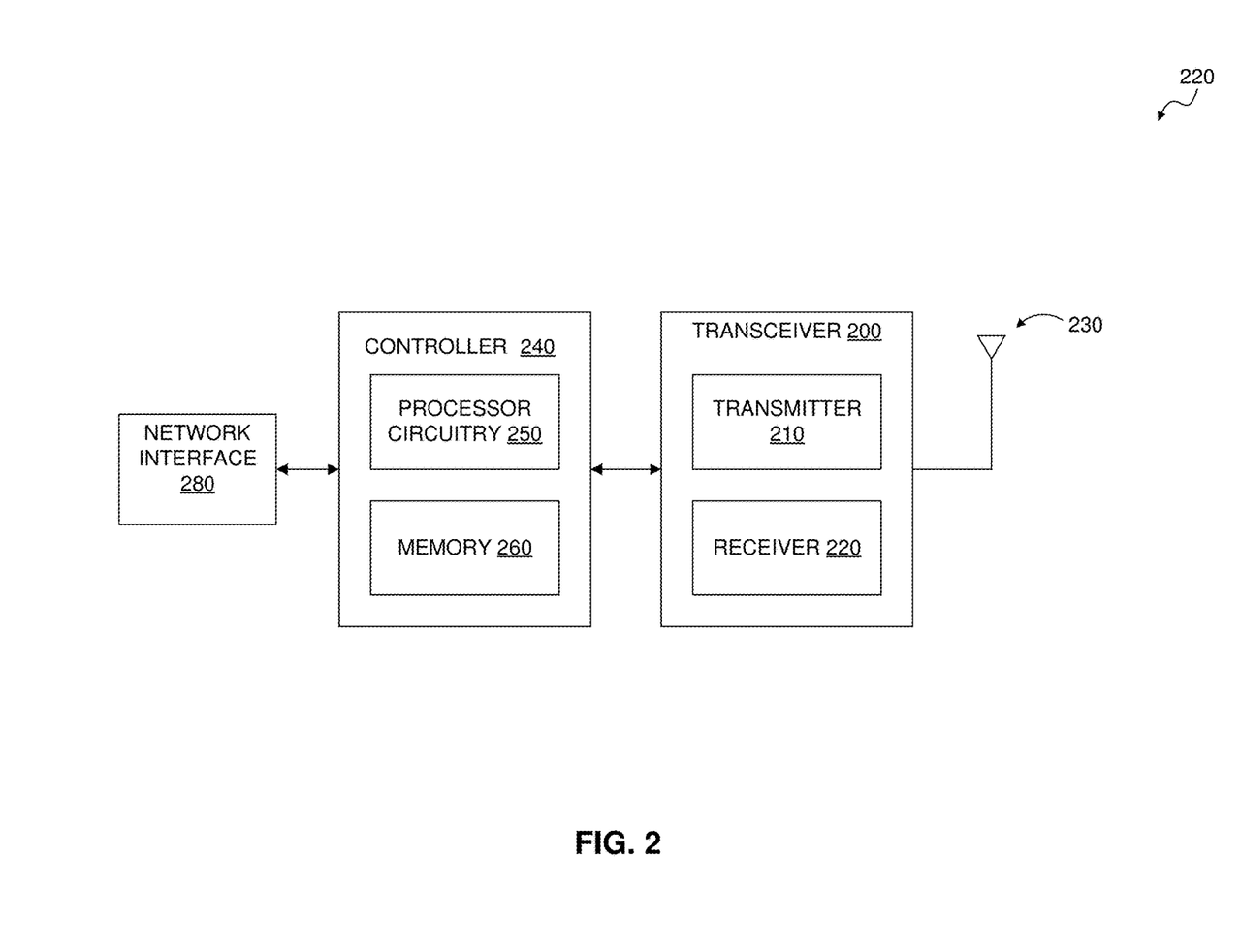
FIG. 2 illustrates a base station according to an exemplary aspect of the present disclosure.

FIG. 2 illustrates the base station 220 according to an exemplary aspect of the present disclosure. The base station 220 can be an exemplary aspect of the base station 120. The base station 220 can include a transceiver 200 and a network interface 280, each communicatively coupled to controller 240.

The transceiver 200 includes processor circuitry that is configured to transmit and/or receive wireless communications via one or more wireless technologies within the communication environment 100. For example, the transceiver 200 can include one or more transmitters 210 and one or more receivers 220 that configured to transmit and receive wireless communications, respectively, via one or more antennas 230. Those skilled in the relevant art(s) will recognize that the transceiver 200 can also include (but is not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 230 may include an integer array of antennas, and that the antenna 230 may be capable of both transmitting and receiving wireless communication signals. For example, the base station 120 can be configured for wireless communication utilizing a Multiple-input Multiple-output (MIMO) configuration.

In an exemplary aspect, the transceiver 200 is configured for wireless communications conforming to, for example, the Long-Term Evolution (LTE) protocol. In this example, the transceiver 200 can be referred to as LTE transceiver 200. Those skilled in the relevant art(s) will understand that the transceiver 200 is not limited to LTE communications, and can be configured for communications that conform to one or more other protocols.

The network interface 280 includes processor circuitry that is configured to transmit and/or receive communications via one or more wired technologies to/from the backhaul communication network 111. Those skilled in the relevant art(s) will recognize that the network interface 280 can also include (but is not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will understand that the network interface 280 is not limited to wired communication technologies and can be configured for communications that conform to one or more well-known wireless technologies in addition to, or alternatively to, one or more well-known wired technologies.

The controller 240 can include processor circuitry 250 that is configured to carry out instructions to perform arithmetical, logical, and/or input/output (I/O) operations of the base station 120 and/or one or more components of the base station 120. The processor circuitry 250 can be configured control the operation of the transceiver 200—including, for example, transmitting and/or receiving of wireless communications via the transceiver 200, and/or perform one or more baseband processing functions (e.g., media access control (MAC), encoding/decoding, modulation/demodulation, data symbol mapping, error correction, etc.).

The controller 240 can further include a memory 260 that stores data and/or instructions, where when the instructions are executed by the processor circuitry 250, controls the processor circuitry 250 to perform the functions described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

Figure 3:
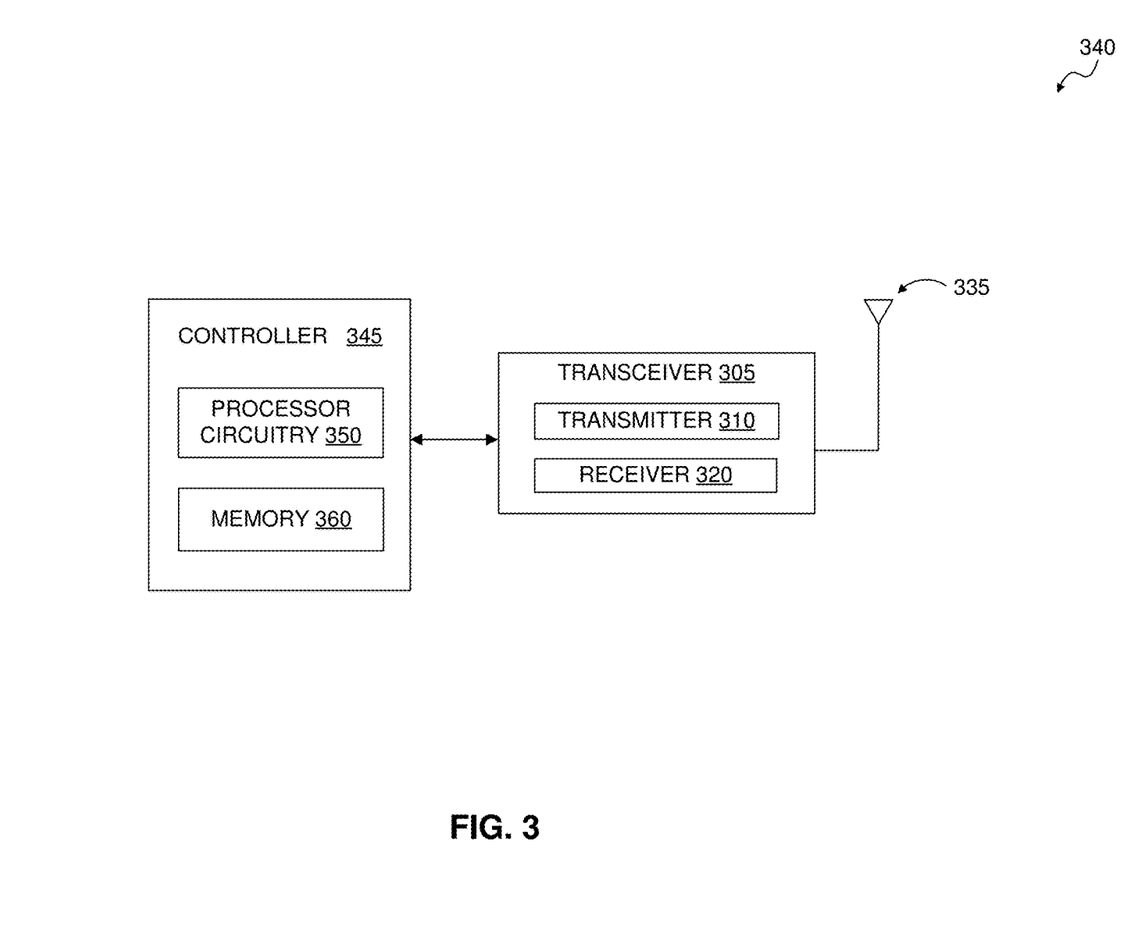
FIG. 3 illustrates a mobile device according to an exemplary aspect of the present disclosure.

FIG. 3 illustrates a mobile device 340 according to an exemplary aspect of the present disclosure. The mobile device 340 can be an exemplary aspect of the mobile device 140. The mobile device 340 is configured to transmit and/or receive wireless communications via one or more wireless technologies. For example, the mobile device 340 can be configured for wireless communications conforming to, for example, the Long-Term Evolution (LTE) protocol, but is not limited thereto.

The mobile device 340 can be configured to communicate with one or more other communication devices, including, for example, one or more base stations, one or more access points, one or more other mobile devices, and/or one or more other devices as would be understood by one of ordinary skill in the relevant arts.

The mobile device 340 can include a controller 345 communicatively coupled to one or more transceivers 305. The transceiver(s) 305 can be configured to transmit and/or receive wireless communications via one or more wireless technologies. The transceiver 305 can include processor circuitry that is configured for transmitting and/or receiving wireless communications conforming to one or more wireless protocols. For example, the transceiver 305 can include a transmitter 310 and a receiver 320 configured for transmitting and receiving wireless communications, respectively, via one or more antennas 335.

In exemplary aspects, the transceiver 305 can include (but is not limited to) a digital signal processor (DSP), modulator and/or demodulator, a digital-to-analog converter (DAC) and/or an analog-to-digital converter (ADC), an encoder/decoder (e.g., encoders/decoders having convolution, tail-biting convolution, turbo, Viterbi, and/or Low Density Parity Check (LDPC) encoder/decoder functionality), a frequency converter (including mixers, local oscillators, and filters), Fast-Fourier Transform (FFT), precoder, and/or constellation mapper/de-mapper that can be utilized in transmitting and/or receiving of wireless communications. Further, those skilled in the relevant art(s) will recognize that antenna 335 may include an integer array of antennas, and that the antennas may be capable of both transmitting and receiving wireless communication signals. In aspects having two or more transceivers 305, the two or more transceivers 305 can have their own antenna 335, or can share a common antenna via a duplexer.

The controller 345 can include processor circuitry 350 that is configured to control the overall operation of the mobile device 340, such as the operation of the transceiver(s) 305. The processor circuitry 350 can be configured to control the transmitting and/or receiving of wireless communications via the transceiver(s) 305, and/or perform one or more baseband processing functions (e.g., media access control (MAC), encoding/decoding, modulation/demodulation, data symbol mapping; error correction, etc.). The processor circuitry 350 can be configured to run one or more applications and/or operating systems; power management (e.g., battery control and monitoring); display settings; volume control; and/or user interactions via one or more user interfaces (e.g., keyboard, touchscreen display, microphone, speaker, etc.). In an exemplary aspect, the controller 345 can include one or more elements of a protocol stack such as, a physical (PHY) layer, media access control (MAC), radio link control (RLC), packet data convergence protocol (PDCP), and/or radio resource control (RRC) elements.

Figure 4:
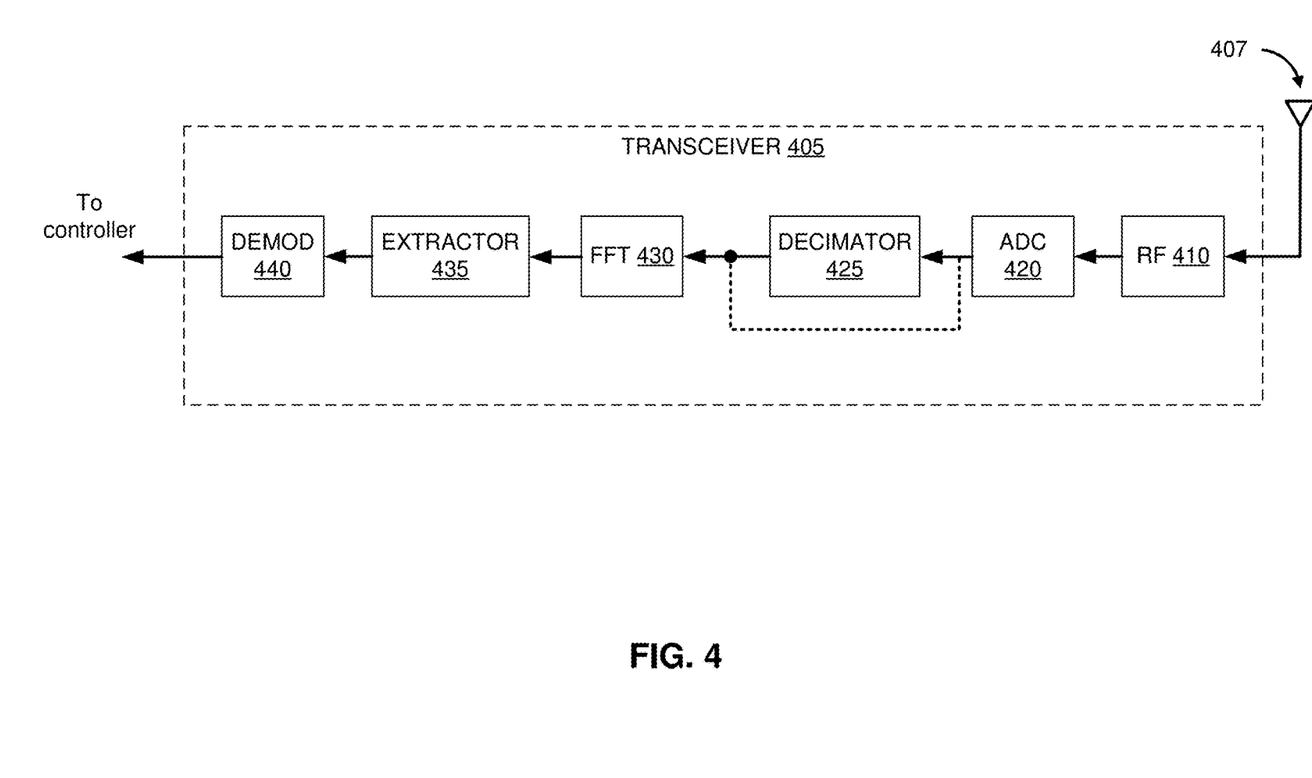
FIG. 4 illustrates a transceiver according to an exemplary aspect of the present disclosure.

In an exemplary aspect, the controller 345 is configured to control the mobile device 340 to perform one or more search and measurement procedures. As described in more detail below, the controller 345 can be configured to control the transceiver 305/405 to generate demodulated resource elements which can be used by the controller 345 to estimate Reference-Signal-Received-Power (RSRP). In an exemplary aspect, the controller 345 is configured to coherently combine the demodulated resource elements provided by the transceiver 305/405 to estimate RSRP.

The controller 345 can further include a memory 360 that stores data and/or instructions, where when the instructions are executed by the processor circuitry 350, controls the processor circuitry 350 to perform the functions described herein. The memory 360 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 360 can be non-removable, removable, or a combination of both.

Examples of the mobile device 340 include (but are not limited to) a mobile computing device—such as a laptop computer, a tablet computer, a mobile telephone or smartphone, a "phablet," a personal digital assistant (PDA), and mobile media player; Internet-of-Things (IOT) devices, and a wearable computing device—such as a computerized wrist watch or "smart" watch, and computerized eyeglasses. In some aspects of the present disclosure, the mobile device 340 may be a stationary communication device, including, for example, a stationary computing device—such as a personal computer (PC), a desktop computer, a computerized kiosk, and an automotive/aeronautical/maritime in-dash computer terminal.

FIG. 4 illustrates a transceiver 405 according to an exemplary aspect of the present disclosure. The transceiver 405 can be an exemplary aspect of the transceiver 305.

In an exemplary aspect, the transceiver 405 can include a radio frequency (RF) frontend 410, an analog-to-digital converter (ADC) 420, a decimator 425, a Fast Fourier Transform (FFT) 430, an extractor 435, and a demodulator 440.

The RF fronted 410 is configured to receive radio frequency (RF) signals via the antenna 407 and process the RF signals to convert the RF signals to one or more intermediate frequency (IF) signals. The RF frontend 410 can include a mixer configured to convert the RF signals to IF signals based on an oscillating signal generated by an oscillator. The RF frontend 410 can include processor circuitry configured to perform one or more operations and/or functions of the RF frontend 410.

The analog-to-digital converter (ADC) 420 is configured to convert one or more analog signals to one or more corresponding digital signals. For example, the ADC 420 can be configured to receive analog IF signals from the RF frontend 410 and to convert the analog signals to digital signals. The ADC 420 can be configured to provide the digital signals to decimator 425 and/or to the FFT 430 bypassing the decimator 425 (as indicated by the dashed line). In an exemplary aspect, the ADC 420 can selectively provide the digital signals to the decimator 425 and the FFT 430 based on one or more search and measurement procedures. For example, the ADC 420 can provide the digital signals to the decimator 425 when the mobile device 340 is currently being served by a base station and performing a search and measurement procedure. The ADC 420 can provide the digital signals to the FFT 430 and bypass the decimator 425 when the mobile device 340 is not currently being served by the base station (e.g., is in an idle mode) and is performing a search and measurement procedure. In an exemplary aspect, the ADC 420 can be configured to downsample a received signal. In this example, the sampling frequency of the ADC 420 can be adjusted to introduce aliasing in the signal so as to function similar to the decimator 425 described below. For example, when the mobile device 340 is not currently being served by the base station (e.g., is in an idle mode), the ADC 420 can be configured to perform the downsampling as the ADC 420 can be configured to sample at other rate than the Nyquist rate. In an exemplary aspect, when in an idle mode, the ADC 420 can be configured to sample at an aliasing-introducing rate. When in an active mode, the ADC 420 can be configured to sample at the Nyquist rate.

The decimator 425 is configured to perform one or more decimation operations on a received signal to reduce the sampling rate of the received signal. The decimator 425 can reduce the sampling rate of the received signal based on decimation factor. In an exemplary aspect, the decimator 425 is configured to reduce the sampling rate of the received signal without filtering the signal so as to introduce aliasing into the downsampled signal. For example, the decimator 425 can be configured to sample the received signal at a rate that is less than the Nyquist rate. In an exemplary aspect, to introduce aliasing, the sampling by the decimator 425 can be such that the following equation is satisfied:

$$2B > f_s$$

where 2B is the Nyquist rate for functions having a bandwidth B and $f_s$ is the sampling frequency. In this example, the aliasing results when the Nyquist criterion is not met $$\left(\text{i.e., } > \frac{f_s}{2}\right).$$

In an exemplary aspect, the decimator 425 can be configured to generate aliased frequencies $f_a$ that satisfy the following equation:

$$f_a = |n \times f_s - f|$$

where $f_s$ is the sampling rate, f is the frequency of the signal being sampled and, $n \times f_s$ is the closest integer multiple of $f_s$ to the sampling rate $f_s$.

Figure 5:
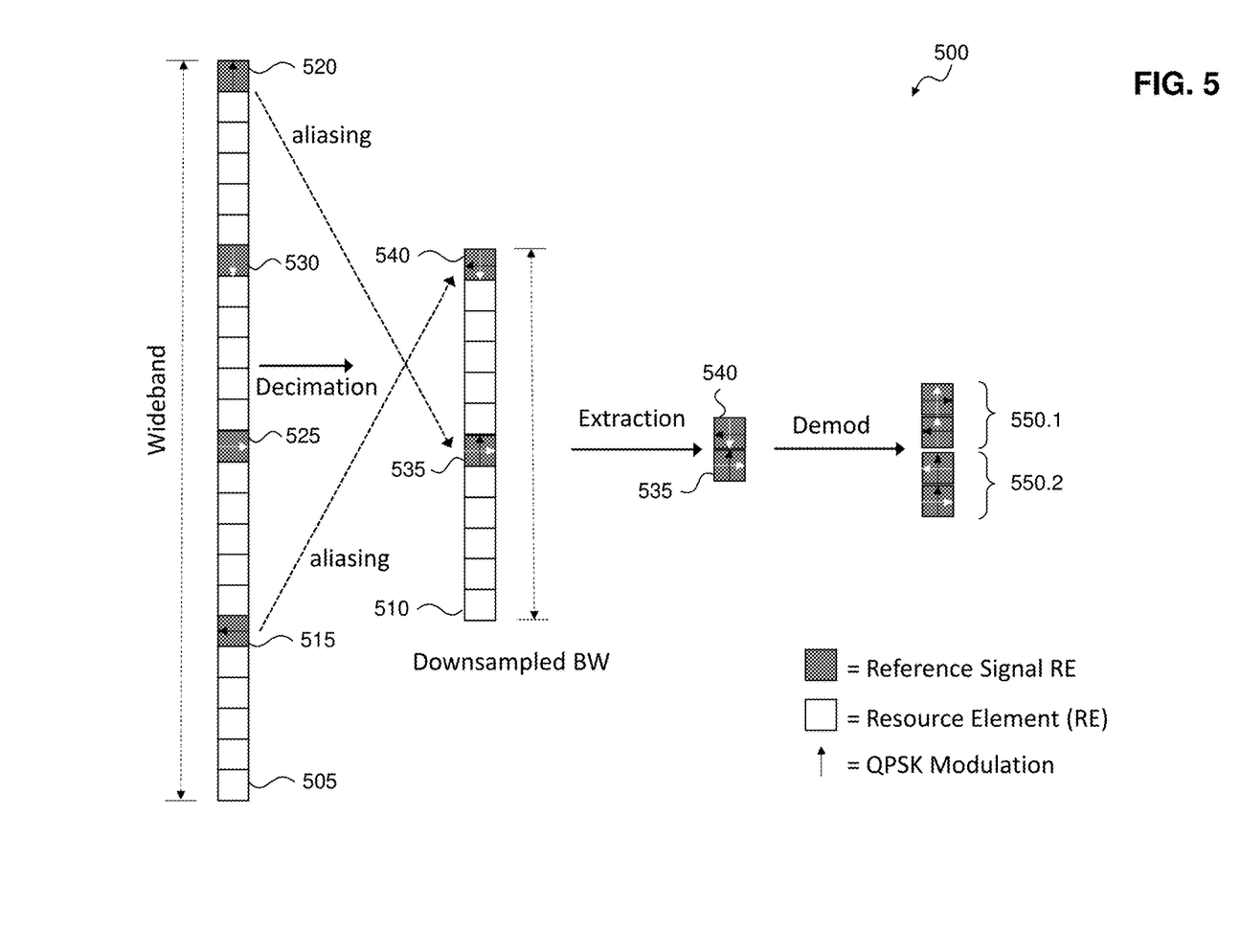
FIG. 5 illustrates a signal processing operation according to an exemplary aspect of the present disclosure.

An example of decimation without filtering is shown in FIG. 5. In an exemplary aspect, the decimator 425 can be configured to filter the signal and downsample the signal, but still introduce aliasing in the decimated signal. In another exemplary aspect, the decimator 425 can be configured to filter the signal and downsample the signal to prevent aliasing (or significantly reduce aliasing) such as illustrated in step 922 in FIG. 9. In this example, the filtering is performed by one or more anti-aliasing filters.

In an exemplary aspect, the decimator 425 can include processor circuitry configured to perform one or more operations and/or functions of the decimator 425. In an exemplary aspect, the decimator 425 can be implemented in hardware (e.g., circuits), firmware, software, or any combination thereof.

The Fast Fourier Transform (FFT) 430 is configured to perform a discrete Fourier transform to convert a signal from its original domain (e.g., time domain) to a representation in the frequency domain. In an exemplary aspect, the FFT 430 can be configured to perform an inverse Fourier transform in additional to or as an alternative to the Fourier transform.

In an exemplary aspect, the FFT 430 is configured to perform one or more Fourier transforms on the received signal from decimator 425 and/or the ADC 420 to generate a frequency domain signal, and to provide the frequency domain signal to the extractor 435.

In an exemplary aspect, the FFT 430 can include processor circuitry configured to perform one or more operations and/or functions of the FFT 430. In an exemplary aspect, the FFT 430 can be implemented in hardware (e.g., circuits), firmware, software, or any combination thereof.

The extractor 435 is configured to perform one or more extraction operations on the frequency domain signal from the FFT 430 to extract one or more resource elements from the received signal. In an exemplary aspect, the extractor 435 is configured to extract one or more reference signal resource elements (e.g., cell specific Reference Signal (cRS)) from the received signal.

In an exemplary aspect, the mobile device 340 (e.g., controller 345) can be configured to perform one or more indexing operations on the digital signal from the ADC 420 based on one or more characteristics of the digital signal, sampling frequency of the ADC 420, sampling frequency of the decimator 425, and/or one or more other signal characteristics or component parameters as would be understood by one of ordinary skill in the art. For example, the mobile device 340 can be configured to index the digital signal based on the bandwidth of the signal and/or the sampling frequency of the ADC 420 and/or decimator 425. In operation, the extractor 435 can be configured to extract one or more resources elements (which can be reference signal resource elements) based on index information determined based on the indexing operation(s).

In an exemplary aspect, the extractor 435 can include processor circuitry configured to perform one or more operations and/or functions of the extractor 435. In an exemplary aspect, the extractor 435 can be implemented in hardware (e.g., circuits), firmware, software, or any combination thereof.

The demodulator 440 is configured to receive one or more extracted resource elements from the extractor 435 and to demodulate the resource element(s). The demodulator 440 can include a mixer and an oscillator (not shown), where the mixer receives the extracted resource element(s) and mixes the resource element(s) with one or more received oscillating signals generated by the oscillator to generate one or more corresponding demodulated resource elements. In an exemplary aspect, the demodulator 440 can be configured to demodulate the resource elements to align the modulation (e.g., Quadrature Phase Shift Keying (QPSK)) to facilitate coherent combining of the extracted resource elements. In this example, the combined resource elements can correspond to an estimate of the Reference-Signal-Received-Power (RSRP). The demodulator 440 can provide the demodulated resource elements to the controller 345, which can be configured to coherently combine the demodulated resource elements to calculate the estimated RSRP.

In an exemplary aspect, the demodulator 440 includes processor circuitry configured to perform one or more functions and/or operations of the demodulator 410, such as demodulating the resource element(s). In an exemplary aspect, the demodulator 440 can be implemented in hardware (e.g., circuits), firmware, software, or any combination thereof.

FIG. 5 illustrates a Reference-Signal-Received-Power (RSRP) signal processing operation 500 according to an exemplary aspect of the present disclosure.

In operation, a signal received by the mobile device is downsampled from a wideband signal to a signal having a downsampled bandwidth. As illustrated in FIG. 5, the signal 505 is downsampled to generate a downsampled signal 510. In an exemplary aspect, the signal 505 is an intermediate frequency (IF) signal generated by FFT 410.

In an exemplary aspect, the signal 505 is decimated by the decimator 425 is configured to perform one or more decimation operations on signal 505 to reduce the sampling rate of the signal 505 to generate signal 510. In an exemplary aspect, the decimator 425 is configured to reduce the sampling rate of the signal 505 without filtering the signal 505 so as to introduce aliasing into the downsampled signal 510. That is, the signal 505 generated by the FFT 410 and analog-to-digitally converted by ADC 420 is not filtered before the decimation operations are performed on the signal 505 by the decimator 425. As shown in FIG. 5, the decimation of the non-filtered signal 505 generates aliasing in the signal 510 as the out-of-band reference signal resource elements 515 and 520 from signal 505 alias into reference signal resource elements 530 and 525, respectively, to form reference signal resource elements 540 and 535. In this example, reference signal resource elements 540 and 535 corresponding to the reference signal resource elements 530 and 525 but include the aliased reference signal resource elements.

Following the decimation operations, the downsampled signal 510 is generated having aliased reference signal resource elements 540 and 535. The reference signal resource elements 540 and 535 are then extracted from the downsampled signal 510. In an exemplary aspect, the extractor 435 extracts reference signal resource elements 540 and 535 from the downsampled signal 510.

The extractor 435 is configured to perform one or more extraction operations to extract one or more resource elements from the received signal. In an exemplary aspect, the extractor 435 is configured to extract one or more reference signal resource elements (e.g., cell specific Reference Signal (cRS)) from the received signal. In an exemplary aspect, the extractor 435 can be configured to extract resources elements based on index information.

In an exemplary aspect, the ADC 420 can be configured to generate the downsampled signal 510 and the downsampled signal 510 can be provided to the extractor 435 for extraction of the reference signal resource elements 540 and 535 while bypassing the decimator 425. In this example, the sampling frequency of the ADC 420 can be adjusted to introduce aliasing in the signal 510 so as to function similar to the decimator 425. For example, when the mobile device 340 is not currently being served by the base station (e.g., is in an idle mode), the ADC 420 can be configured to perform the downsampling as the ADC 420 can be configured to sample at other rates than the Nyquist rate. In an exemplary aspect, the ADC 420 can be configured to sample at the Nyquist rate and the decimator 425 is configured to sample at a different rate to introduce aliasing (e.g., so that the Nyquist criterion is not met $$\left(\text{i.e., } B > \frac{f_s}{2}\right).$$

In an exemplary aspect, when in an idle mode, the ADC 420 can be configured to sample at an aliasing-introducing frequency. When in an active mode, the ADC 420 can be configured to sample at the Nyquist rate.

Following the extraction of the reference signal resource elements 540 and 535 from the downsampled signal 510, the reference signal resource elements 540 and 535 are demodulated to align the modulation (e.g., Quadrature Phase Shift Keying (QPSK)). In this example, the modulation direction of the non-aliased reference signal resource elements 530 and 525 are shown with white arrows within the reference signal resource elements and the aliased modulation direction of the aliased reference signal resource elements 515 and 520 are shown with black arrows within the reference signal resource elements. After decimation, the reference signal resource elements 540 and 535 include both black and white arrows as the reference signal resource elements 515 and 520 have been aliased into the reference signal resource elements 540 and 535, respectively. In an exemplary aspect, the demodulator 440 can demodulate the reference signal resource elements 540 and 535.

In an exemplary aspect, the demodulation of the reference signal resource elements 540 and 535 include a first demodulation operation 550.1 to align the modulation of the non-aliased reference signal resource elements and a second demodulation operation 550.2 to align the modulation of the aliased reference signal resource elements. The demodulation is not limited to multistep demodulation operations and the demodulating can be performed in a single-step demodulation.

The demodulated reference signal resource elements can then be provided to the controller 345, which can be configured to coherently combine the demodulated reference signal resource elements to calculate an estimated Reference-Signal-Received-Power (RSRP).

FIGS. 6A-8 illustrates a Reference-Signal-Received-Power (RSRP) signal processing operation 600 according to an exemplary aspect of the present disclosure. The RSRP signal processing operation is similar to the operation described with reference to FIG. 5. The RSRP signal processing operation 600 can be performed to compensate for a reduction in RSRP estimation accuracy caused by, for example, channel effects (e.g., timing misalignment, fading).

Figure 6A:
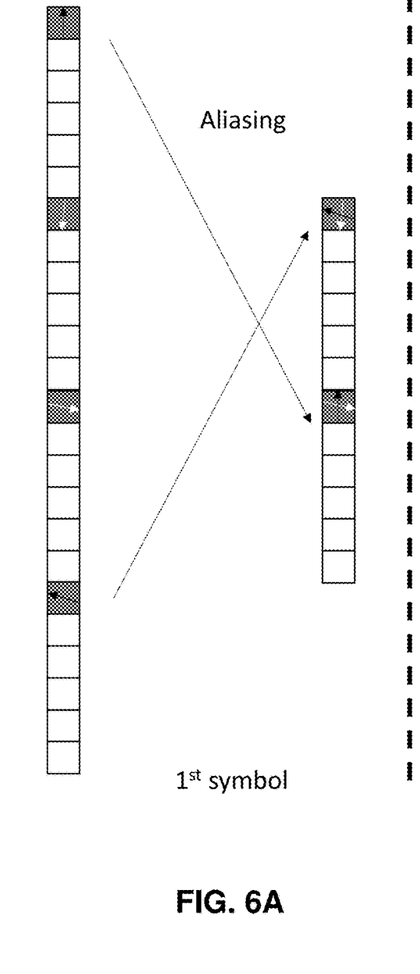
Figure 6B:
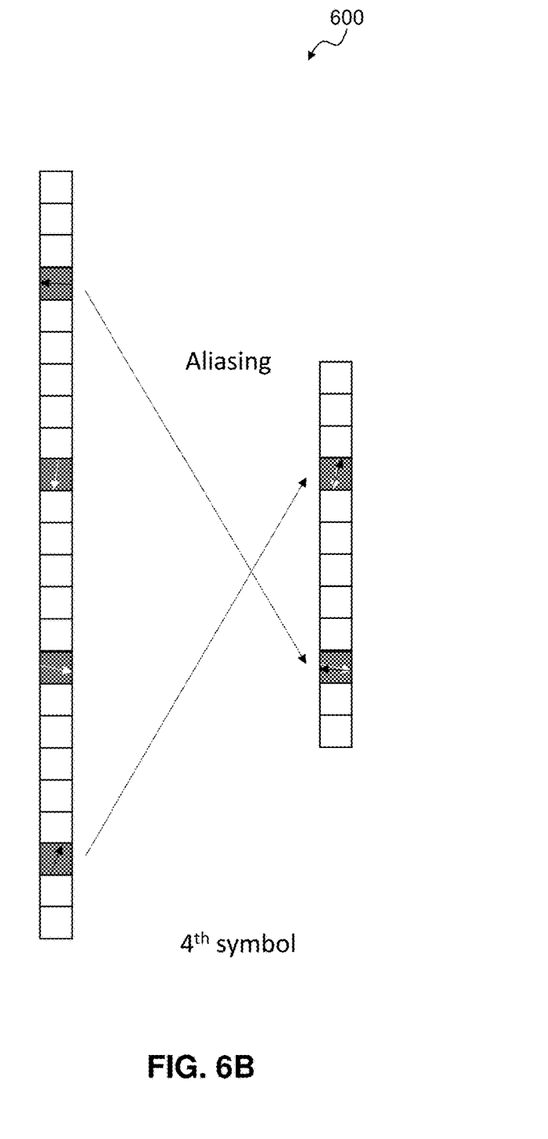

In a non-limiting example of the RSRP signal processing operation 600, the decimation of the signal can be applied to the first and fourth orthogonal frequency-division multiplexing (OFDM) symbols. In an exemplary aspect, with reference to FIG. 6A, the decimation of the signal is applied to the first OFDM symbol. In FIG. 6B, the decimation of the signal is applied to the fourth OFDM symbol.

Figure 7A:
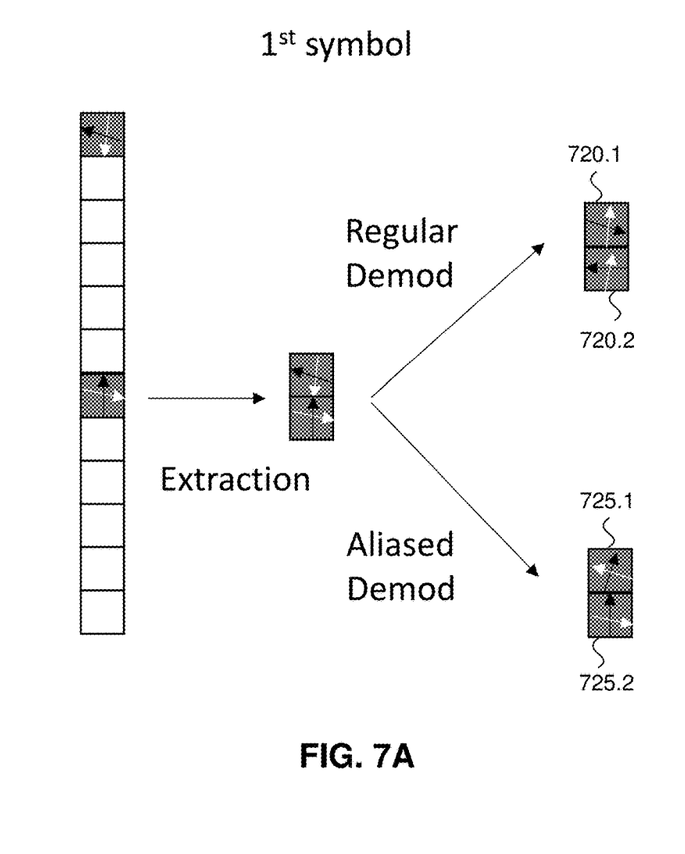
Figure 7B:
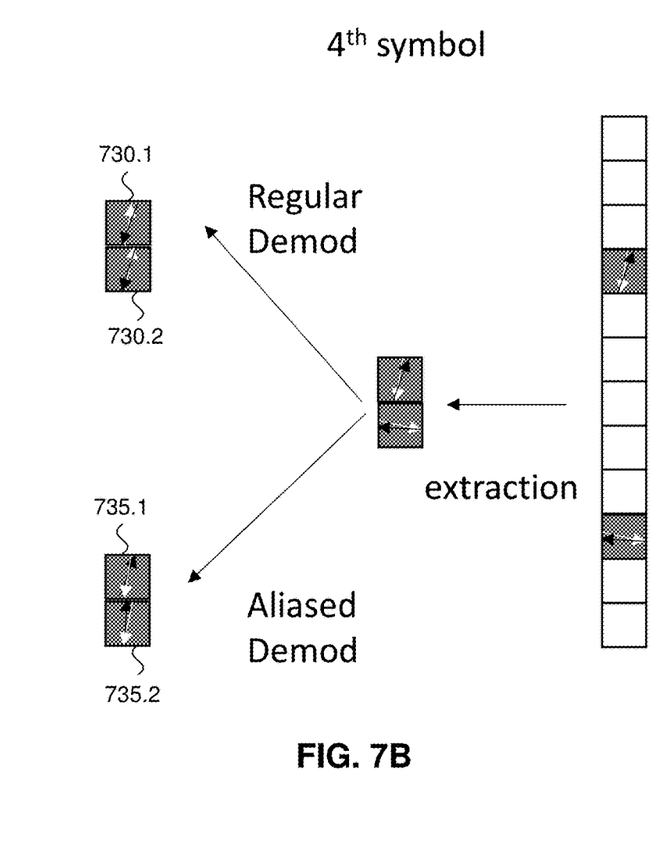

FIGS. 7A and 7B illustrate the corresponding extraction and demodulation of the first and fourth OFDM symbols, respectively. Similar to the demodulation operations illustrated in FIG. 5, the demodulation of the extracted reference signal resource elements includes a demodulation of the aliased reference signal resource elements and the non-aliased reference signal resource elements, resulting in four sets of demodulated reference signal resource elements: first symbol non-aliased reference signal resource elements 720.1 & 720.2; first symbol aliased reference signal resource elements 725.1 & 725.2; fourth symbol non-aliased reference signal resource elements 730.1 & 730.2; and fourth symbol non-aliased reference signal resource elements 735.1 & 735.2.

Figure 8:
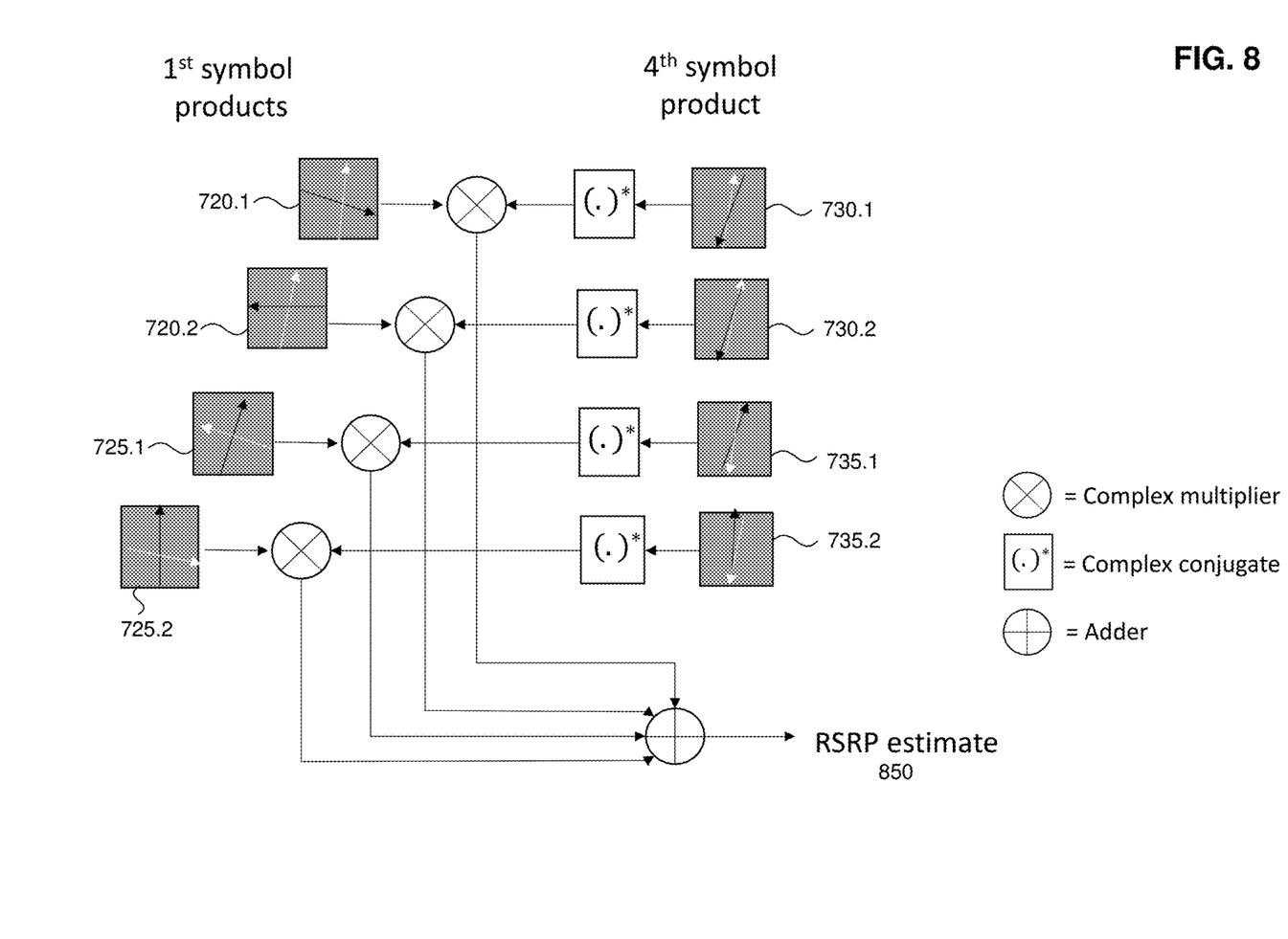

With reference to FIG. 8, each of the fourth symbol demodulated reference signal resource elements 730.1, 730.2, 735.1, and 735.2 are conjugated via a complex conjugator and then multiplied using a complex multiplier with their corresponding first symbol demodulated reference signal resource elements 720.1, 720.2, 725.1, and 725.2, respectively. The results of the multiplications are then coherently combined via an adder to generate the RSRP estimate 850. In this example, the phase effects of the channel are reduced or eliminated by the multiplication of the complex conjugate. In an exemplary aspect, the controller 345 can include the complex conjugator, complex multiplier and adder, and be configured to perform the complex conjugation, complex multiplication, and addition.

Figure 9:
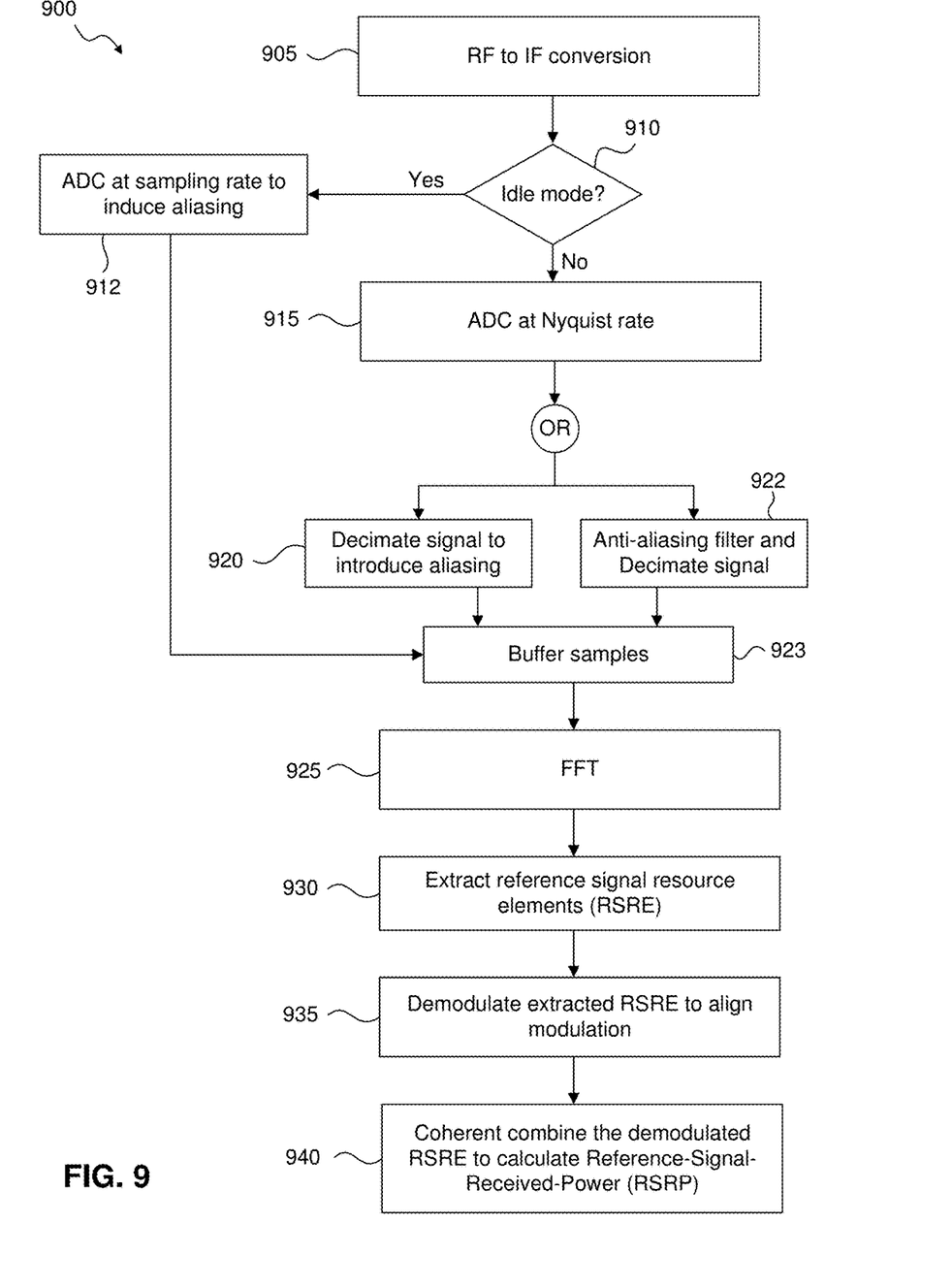
FIG. 9 illustrate a Reference-Signal-Received-Power (RSRP) estimation method according to an exemplary aspect of the present disclosure.

Turning to FIG. 9, a flowchart of a Reference-Signal-Received-Power (RSRP) estimation method 900 according to an exemplary aspect of the present disclosure is illustrated. The flowchart is described with continued reference to FIGS. 1-8. The steps of the method are not limited to the order described below, and the various steps may be performed in a different order. Further, two or more steps of the method may be performed simultaneously with each other.

The method of flowchart 900 begins at step 905, where a received radio frequency (RF) signal is converted to an intermediate frequency (IF) signal. In an exemplary aspect, the RF frontend 410 is configured to convert the RF signal to generate an IF signal.

After step 905, the flowchart 900 transitions to step 910, where it is determined whether the mobile device is operating in an idle mode (e.g., is not currently being served by the base station). If the mobile device is operating in an idle mode (YES at 910), the flowchart transitions to step 912. At step 912, the IF signal is analog-to-digitally converted at a sampling rate to introduce aliasing in the signal. In an exemplary aspect, the downsampling of the signal does not included filtering the signal. In an exemplary aspect, the analog-to-digital converter (ADC) 420 is configured to convert analog signals to one or more corresponding digital signals and to downsample the signal at the alias-introducing sampling rate. After step 912, the flowchart 900 transitions to step 925, which is discussed below.

If the mobile device is not operating in an idle mode (e.g., is currently being served by the base station) (NO at 910), the flowchart transitions to step 915, where the IF signal is analog-to-digitally converted at the Nyquist rate. In an exemplary aspect, the ADC 420 is configured to convert analog signals to one or more corresponding digital signals and to sample the signal at the Nyquist rate.

After step 915, the flowchart 900 transitions to either step 920 or step 922.

At step 920, the digital signal is decimated. The decimation can be based on a decimation factor. In an exemplary aspect, the decimation downsamples the signal without filtering the signal so as to introduce aliasing into the downsampled signal. In an exemplary aspect, the decimator 425 is configured to perform one or more decimation operations to decimate the signal.

At step 922, the digital signal is filtered using anti-aliasing filtering and decimated. The decimation can be based on a decimation factor. In an exemplary aspect, the decimation downsamples the signal that has been filtered so as to not introduce (or significantly reduce) aliasing into the downsampled signal. In an exemplary aspect, the decimator 425 is configured to perform one or more anti-aliasing filtering and decimation operations to filter and decimate the signal.

After steps 920 and 922, the flowchart 900 transitions to step 923, where the samples of the signal are buffered. For example, the samples can be saved in a buffer, cache, or other memory. The buffer, cache, or other memory can be included within the ADC 420, decimator 425, FFT 430, memory 360, or other component of the mobile device 340.

After step 923, the flowchart 900 transitions to step 925, where the buffered samples are Fast Fourier Transformed to represent the signal samples in the frequency domain. In an exemplary aspect, the Fast Fourier Transform (FFT) 430 is configured to perform the discrete Fourier transform.

After step 925 the flowchart 900 transitions to step 930, where one or more extraction operations are performed on the frequency domain signal to extract one or more resource elements from the signal. The extracted resource elements can be one or more reference signal resource elements (e.g., cell specific Reference Signal (cRS)). In an exemplary aspect, the extractor 435 is configured to perform the one or more extraction operations. In operation, the extractor 435 can be configured to extract one or more resources elements (which can be reference signal resource elements) based on index information. The index information can be determined based on indexing operation(s). The indexing operations can be based on one or more characteristics of the digital signal, sampling frequency of the ADC 420, sampling frequency of the decimator 425, and/or one or more other signal characteristics or component parameters as would be understood by one of ordinary skill in the art.

After step 930 the flowchart 900 transitions to step 935, where the extracted resource elements (e.g., reference signal resource elements) are demodulated. The demodulation can align the modulation (e.g., Quadrature Phase Shift Keying (QPSK)) of the resource elements to facilitate coherent combining of the extracted resource elements. In an exemplary aspect, the demodulator 440 is configured to receive one or extracted resource elements from the extractor 435 and to demodulate the resource element(s).

After step 935 the flowchart 900 transitions to step 940, where the demodulated resource elements (e.g. demodulated reference signal resource elements) are coherently combined to estimate the Reference-Signal-Received-Power (RSRP). In an exemplary aspect, the controller 345 is configured to estimate the RSRP based on the demodulated resource elements.

The method 900 can be repeated for one or more subsequent search and measurement operations performed by the mobile device.

EXAMPLES

Example 1 is a communication device, comprising: a transceiver configured to: downsample a received signal comprising a plurality of reference signal resource elements to generate a downsampled signal, wherein the downsampling aliases a first of the plurality of reference signal resource elements into a second of the plurality of reference signal resource elements to generate an aliased reference signal resource element; and extract the aliased reference signal resource element from the downsampled signal; and a controller coupled to the transceiver and configured to estimate a Reference-Signal-Received-Power (RSRP) based on the extracted aliased reference signal resource element.

In Example 2, the subject matter of Example 1, wherein: the transceiver is further configured to demodulate the extracted aliased reference signal resource element to generate a demodulated reference signal resource element; and the controller is further configured to estimate the RSRP based on the demodulated reference signal resource element.

In Example 3, the subject matter of Example 1, wherein the transceiver comprises a decimator that is configured to downsample the received signal to generate the downsampled signal.

In Example 4, the subject matter of Example 3, wherein the transceiver further comprises an analog-to-digital converter (ADC) that is configured to generate the received signal based on a received analog signal.

In Example 5, the subject matter of Example 1, wherein the transceiver comprises an analog-to-digital converter (ADC) that is configured to downsample the received signal to generate the downsampled signal when the communication device is operating in an idle mode.

In Example 6, the subject matter of Example 5, wherein: the transceiver further comprises a decimator; and when operating in an active mode, the ADC is configured to generate the received signal based on a received analog signal and the decimator is configured to downsample the received signal to generate the downsampled signal.

In Example 7, the subject matter of Example 1, wherein: the downsampling aliases a third of the plurality of reference signal resource elements into a fourth of the plurality of reference signal resource elements to generate another aliased reference signal resource element; the transceiver is further configured to extract the other aliased reference signal resource element; and the controller is configured to estimate the RSRP based on the extracted aliased reference signal resource element and the other aliased reference signal resource element.

In Example 8, the subject matter of Example 7, wherein: the transceiver is further configured to demodulate the extracted aliased reference signal resource element and the extracted other aliased reference signal resource element to generate a first demodulated reference signal resource element and a second demodulated reference signal resource element; and the controller is configured to estimate the RSRP based on the first and the second demodulated reference signal resource elements.

In Example 9, the subject matter of Example 8, wherein the demodulation of the extracted first and second reference signal resources elements aligns modulations of the extracted first and second reference signal resources elements.

In Example 10, the subject matter of Example 8, wherein the demodulation of the extracted first and second reference signal resources elements comprises: demodulating the extracted first and second reference signal resources elements to align a modulation of the extracted first and the extracted second reference signal resources elements based on modulations of the second of the plurality of reference signal resource elements and the fourth of the plurality of reference signal resource elements; and demodulating the extracted first and second reference signal resources elements to align a modulation of the extracted first and the extracted second reference signal resources element based on modulations of the first of the plurality of reference signal resource elements and the third of the plurality of reference signal resource elements.

Example 11 is a communication device, comprising: a transceiver comprising a decimator that is configured to downsample a received signal comprising reference signal resource elements to generate a downsampled signal, wherein the downsampling aliases a first of the reference signal resource elements into a second of the reference signal resource elements to generate a first aliased reference signal resource element, and aliases a third of the reference signal resource elements into a fourth of the reference signal resource elements to generate a second aliased reference signal resource element; and a controller coupled to the transceiver and configured to estimate a Reference-Signal-Received-Power (RSRP) based on the first and the second aliased reference signal resource elements.

In Example 12, the subject matter of Example 11, wherein: the transceiver further comprises a demodulator that is configured to demodulate the first and the second aliased reference signal resource elements to generate a first set of demodulated reference signal resource elements and a second set of demodulated reference signal resource elements; and the controller is further configured to estimate the RSRP based on the first and the second sets of demodulated reference signal resource elements.

In Example 13, the subject matter of Example 12, wherein: the first set of the demodulated reference signal resource elements comprises the first and the second aliased reference signal resource elements having been aligned based on modulations of the second of the reference signal resource elements and the fourth of the reference signal resource elements; and the second set of the demodulated reference signal resource elements comprises the first and the second aliased reference signal resource elements having been aligned based on modulations of the first of the reference signal resource elements and the third of the reference signal resource elements.

In Example 14, the subject matter of Example 11, wherein the transceiver further comprises an extractor that is configured to extract the first aliased reference signal resource element and the second aliased reference signal resource element from the downsampled signal, wherein the controller is configured to estimate the RSRP based on the extracted first and the extracted second aliased reference signal resource elements.

In Example 15, the subject matter of Example 11, wherein the transceiver further comprises an analog-to-digital converter (ADC) that is configured to generate the received signal based on a received analog signal.

In Example 16, the subject matter of Example 15, wherein, when the communication device is operating in an idle mode, the ADC is further configured to downsample the received signal to generate the downsampled signal and the decimator is bypassed.

Example 17 is a Reference-Signal-Received-Power (RSRP) estimation method, comprising: decimating a received signal to downsample the received signal to generate a downsampled signal, the received signal having reference signal resource elements, wherein the downsampling aliases a first of the reference signal resource elements into a second of the reference signal resource elements to generate a first aliased reference signal resource element, and aliases a third of the reference signal resource elements into a fourth of the reference signal resource elements to generate a second aliased reference signal resource element; and estimating a Reference-Signal-Received-Power (RSRP) based on the first and the second aliased reference signal resource elements.

In Example 18, the subject matter of Example 17, further comprising: demodulating the first and the second aliased reference signal resource elements to generate a first set of demodulated reference signal resource elements and a second set of demodulated reference signal resource elements, wherein the estimation of the RSRP is based on the first and the second sets of demodulated reference signal resource elements.

In Example 19, the subject matter of Example 18, wherein: the first set of the demodulated reference signal resource elements comprises the first and the second aliased reference signal resource elements having been aligned based on modulations of the second of the reference signal resource elements and the fourth of the reference signal resource elements; and the second set of the demodulated reference signal resource elements comprises the first and the second aliased reference signal resource elements having been aligned based on modulations of the first of the reference signal resource elements and the third of the reference signal resource elements.

In Example 20, the subject matter of Example 17, further comprising: extracting the first aliased reference signal resource element and the second aliased reference signal resource element from the downsampled signal, wherein the estimation of the RSRP is based on the extracted first aliased reference signal resource element and the extracted second aliased reference signal resource element.

Example 21 is a computer program product embodied on a computer-readable medium comprising program instructions, when executed, causes a machine to perform the method of any of claims 17-20.

Example 22 is a communication device configured to perform the method as claimed in any of claims 17-20.

Example 23 is a communication device comprising means to perform the method as claimed in any of claims 17-20.

Example 24 is an apparatus substantially as shown and described.

Example 25 is a method substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to Long-Term Evolution (LTE) and can be applied to other cellular or non-cellular communication protocols (e.g., one or more 5G protocols) as would be understood by one of ordinary skill in the relevant arts. Further, exemplary aspects are not limited to wireless networks and can be used or implemented in one or more wired networks using one or more well-known wired specifications and/or protocols.

What is claimed is:

1. A communication device, comprising:
a transceiver configured to:
downsample a received signal comprising a plurality of reference signal resource elements to generate a downsampled signal, wherein the downsampling aliases a first of the plurality of reference signal resource elements into a second of the plurality of reference signal resource elements to generate a first aliased reference signal resource element, and aliases a third of the plurality of reference signal resource elements into a fourth of the plurality of reference signal resource elements to generate a second aliased reference signal resource element; and
extract the first aliased reference signal resource element and the second aliased reference signal resource element from the downsampled signal; and
a controller coupled to the transceiver and configured to estimate a Reference-Signal-Received-Power (RSRP) based on the extracted first aliased reference signal resource element and the extracted second aliased reference signal resource element.

2. The communication device of claim 1, wherein:
the transceiver is further configured to demodulate the extracted first aliased reference signal resource element to generate a first demodulated reference signal resource element; and
the controller is further configured to estimate the RSRP based on the first demodulated reference signal resource element.

3. The communication device of claim 1, wherein the transceiver comprises a decimator that is configured to downsample the received signal to generate the downsampled signal.

4. The communication device of claim 3, wherein the transceiver further comprises an analog-to-digital converter (ADC) that is configured to generate the received signal based on a received analog signal.

5. The communication device of claim 1, wherein the transceiver comprises an analog-to-digital converter (ADC) that is configured to downsample the received signal to generate the downsampled signal when the communication device is operating in an idle mode.

6. The communication device of claim 5, wherein:
the transceiver further comprises a decimator; and
when operating in an active mode, the ADC is configured to generate the received signal based on a received analog signal and the decimator is configured to downsample the received signal to generate the downsampled signal.

7. The communication device of claim 1, wherein:
the transceiver is further configured to align a modulation of the extracted first and the extracted second aliased reference signal resources elements based on modulations of the second of the plurality of reference signal resource elements and the fourth of the plurality of reference signal resource elements to generate a first aligned reference signal resource element, and align a modulation of the extracted first and the extracted second aliased reference signal resources element based on modulations of the first of the plurality of reference signal resource elements and the third of the plurality of reference signal resource elements to generate a second aligned reference signal resource element; and
the controller is configured to estimate the RSRP based on the first and the second aligned reference signal resource elements.

8. The communication device of claim 1, wherein:
the transceiver is further configured to demodulate the extracted first aliased reference signal resource element and the extracted second aliased reference signal resource element to generate a first demodulated reference signal resource element and a second demodulated reference signal resource element; and the controller is configured to estimate the RSRP based on the first and the second demodulated reference signal resource elements.

9. The communication device of claim 8, wherein the demodulation of the extracted first and second reference signal resources elements aligns modulations of the extracted first and second reference signal resources elements.

10. The communication device of claim 8, wherein the demodulation of the extracted first and second aliased reference signal resources elements comprises:

demodulating the extracted first and second aliased reference signal resources elements to align a modulation of the extracted first and the extracted second aliased reference signal resources elements based on modulations of the second of the plurality of reference signal resource elements and the fourth of the plurality of reference signal resource elements; and demodulating the extracted first and second aliased reference signal resources elements to align a modulation of the extracted first and the extracted second aliased reference signal resources element based on modulations of the first of the plurality of reference signal resource elements and the third of the plurality of reference signal resource elements.

11. A communication device, comprising:

a transceiver comprising a decimator that is configured to downsample a received signal comprising reference signal resource elements to generate a downsampled signal, wherein the downsampling aliases a first of the reference signal resource elements into a second of the reference signal resource elements to generate a first aliased reference signal resource element, and aliases a third of the reference signal resource elements into a fourth of the reference signal resource elements to generate a second aliased reference signal resource element; and a controller coupled to the transceiver and configured to estimate a Reference-Signal-Received-Power (RSRP) based on the first and the second aliased reference signal resource elements.

12. The communication device of claim 11, wherein:

the transceiver further comprises a demodulator that is configured to demodulate the first and the second aliased reference signal resource elements to generate a first set of demodulated reference signal resource elements and a second set of demodulated reference signal resource elements; and the controller is further configured to estimate the RSRP based on the first and the second sets of demodulated reference signal resource elements.

13. The communication device of claim 12, wherein:

the first set of the demodulated reference signal resource elements comprises the first and the second aliased reference signal resource elements having been aligned based on modulations of the second of the reference signal resource elements and the fourth of the reference signal resource elements; and the second set of the demodulated reference signal resource elements comprises the first and the second aliased reference signal resource elements having been aligned based on modulations of the first of the reference signal resource elements and the third of the reference signal resource elements.

14. The communication device of claim 11, wherein the transceiver further comprises an extractor that is configured to extract the first aliased reference signal resource element and the second aliased reference signal resource element from the downsampled signal, wherein the controller is configured to estimate the RSRP based on the extracted first and the extracted second aliased reference signal resource elements.

15. The communication device of claim 11, wherein the transceiver further comprises an analog-to-digital converter (ADC) that is configured to generate the received signal based on a received analog signal.

16. The communication device of claim 15, wherein, when the communication device is operating in an idle mode, the ADC is further configured to downsample the received signal to generate the downsampled signal and the decimator is bypassed.

17. A Reference-Signal-Received-Power (RSRP) estimation method, comprising:

decimating a received signal to downsample the received signal to generate a downsampled signal, the received signal having reference signal resource elements, wherein the downsampling aliases a first of the reference signal resource elements into a second of the reference signal resource elements to generate a first aliased reference signal resource element, and aliases a third of the reference signal resource elements into a fourth of the reference signal resource elements to generate a second aliased reference signal resource element; and estimating a Reference-Signal-Received-Power (RSRP) based on the first and the second aliased reference signal resource elements.

18. The RSRP estimation method of claim 17, further comprising:

demodulating the first and the second aliased reference signal resource elements to generate a first set of demodulated reference signal resource elements and a second set of demodulated reference signal resource elements, wherein the estimation of the RSRP is based on the first and the second sets of demodulated reference signal resource elements.

19. The RSRP estimation method of claim 18, wherein:

the first set of the demodulated reference signal resource elements comprises the first and the second aliased reference signal resource elements having been aligned based on modulations of the second of the reference signal resource elements and the fourth of the reference signal resource elements; and the second set of the demodulated reference signal resource elements comprises the first and the second aliased reference signal resource elements having been aligned based on modulations of the first of the reference signal resource elements and the third of the reference signal resource elements.

20. The RSRP estimation method of claim 17, further comprising:

extracting the first aliased reference signal resource element and the second aliased reference signal resource element from the downsampled signal, wherein the estimation of the RSRP is based on the extracted first aliased reference signal resource element and the extracted second aliased reference signal resource element.

\* \* \* \* \*